July 22, 1958 V. G. BRUNDERMAN 2,844,209
MOTORIZED VEHICLE

Filed Jan. 17, 1956 2 Sheets-Sheet 1

VINCENT G. BRUNDERMAN
INVENTOR.

BY Jerome F. Fallon

July 22, 1958 V. G. BRUNDERMAN 2,844,209
MOTORIZED VEHICLE

Filed Jan. 17, 1956 2 Sheets-Sheet 2

VINCENT G. BRUNDERMAN
INVENTOR.

BY Jerome F. Fallon

United States Patent Office 2,844,209
Patented July 22, 1958

2,844,209

MOTORIZED VEHICLE

Vincent G. Brunderman, Chicago, Ill., assignor to Jetgo Manufacturing Company, Chicago, Ill., a partnership Application January 17, 1956, Serial No. 559,553

1 Claim. (Cl. 180—89)

This invention relates to a motorized vehicle and, more particularly, to a vehicle for transporting golfers and their equipment around a golf course.

With the widespread interest in golf, it is natural that some players would like to continue the sport but find the long walk too arduous, especially crippled golfers or those with heart conditions or other physical disabilities. Such players could continue to participate in the sport and realize the benefit of outdoor sunshine and fresh air if some of the effort involved in playing golf were removed. It is therefore an object of my invention to provide a motorized vehicle to perform the function of transporting golfers and their equipment around a golf course.

The vehicles currently used for such purposes have been found limited in their range and ease of operation. A conventional battery-powered vehicle runs out of power at between 27 to 36 holes under favorable conditions, so that there is a substantial chance that the vehicle will stop out on the middle of the golf course.

By the improved vehicle of my invention, I have effectively extended the range of operation of a golfer-carrier to at least 54 holes without charging of batteries, without sacrificing the light weight considered essential for easy operation. Light weight in such a vehicle has the further significant advantage of permitting the vehicle to be driven on the fairway rather than being confined to the rough.

Figure 1:
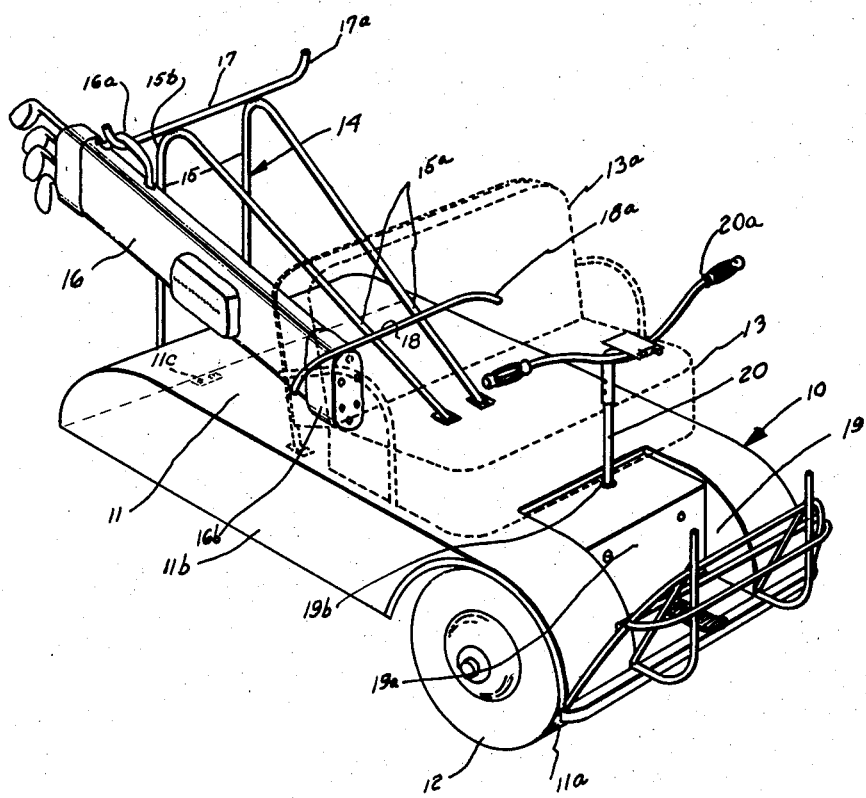
Figure 2:
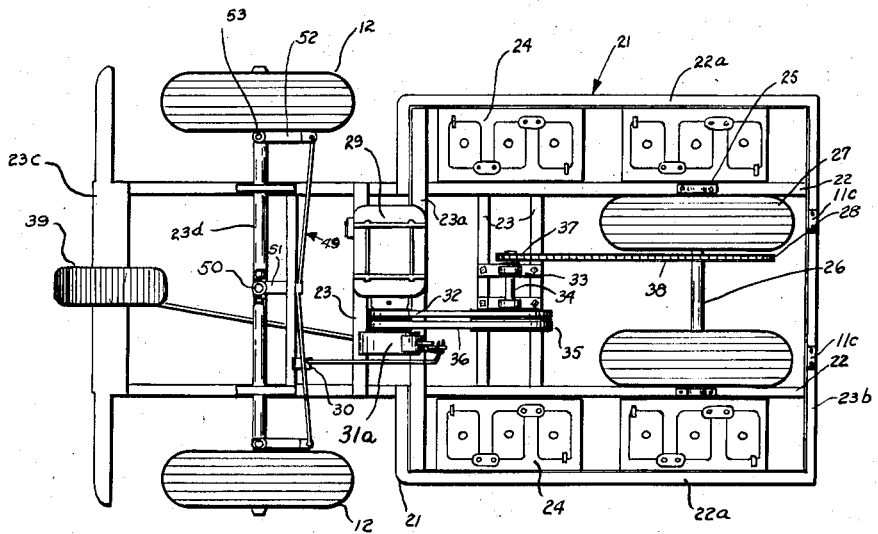
Figure 3:
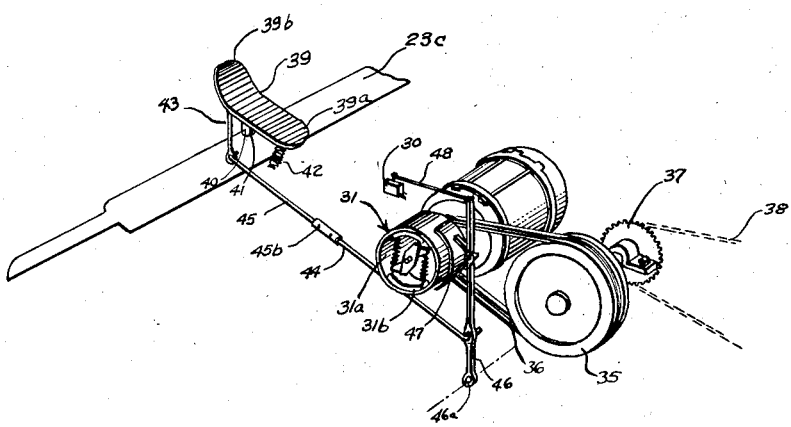

My invention will be explained in conjunction with the accompanying drawing in which Fig. 1 is a perspective view of the vehicle of my invention; Fig. 2 is a top plan view of my vehicle with the body removed so as to show particularly the transmission mechanism; and Fig. 3 is a fragmentary perspective schematic view of the transmission mechanism.

Referring now to the drawing, and Fig. 1 in particular, the numeral 10 denotes generally the vehicle of my invention. Vehicle 10 includes a body portion 11 mounted on and hinged to a frame 21 (not shown on Fig. 1, but which can be seen in Fig. 2). Also mounted on the frame and supporting the frame from the ground are four wheels, only one of which, designated 12, is seen in Fig. 1. Mounted on the top side of body 11 is seat 13, depicted in dotted lines so as to permit observation of bag rack, generally designated 14, which is also mounted on the top side of body 11, but rearward of seat 13. The portion of the frame supporting that portion of body 11, on which seat 13 and bag rack 14 are mounted, is rectangular in outline, the rear transverse member providing a base to which the rear side of body 11 is hinged as at 11c (seen in Fig. 2).

Bag rack 14 is constructed of 7/8 inch welded tubing and includes four structural members. The four structural members include two main vertical members 15 and crossbars 17 and 18. The main vertical members 15 of bag rack 14 are bent on themselves approximately 330 degrees to form a pair of knee braces. The ends of the knee braces thus formed are secured to body 11, the ends of the angled limbs 15a being spaced somewhat closer together than the ends of the vertical limbs 15. The ends of angled limbs 15a are anchored to body 11. Welded to the top surface of vertical members 15 are cross bars 17 and 18, positioned at the knee or bend of vertical members 15 and near the ends of angled limbs 15a, respectively. Golf bag 16 is suspended on bag rack 14 by its handle 16a, the end 16b of golf bag 16 bearing against the underside of cross member 18. Since the main weight of golf bag 16 when carrying clubs is near the top, cross member 17 acts as a fulcrum so that the above described action of bag 16 in bearing against cross member 18 is achieved. Cross member 17 is curved upwardly as at 17a and cross member 18 is curved downwardly as at 18a to prevent inadvertent dislodgement of bag 16. Bag 16 is also maintained against sliding inwardly by knee brace 15 which is extended a slight distance rearward of cross bar 17. Thus, I have provided a bag rack permitting ready and secure mounting of golf bags without the need to resort to straps.

Body 11 is generally of a rectangular nature, having its top portion curved downwardly at its front and rear extremities to form mud guards or fenders, as best seen at 11a. The sides are enclosed by vertical plates 11b. A rectangular central portion 19 is struck from the downwardly curved front wall 11a to provide comfortable leg area for the driver of vehicle 10. Z-shaped plate 19a is independently secured to the frame, thus permitting body 11 to be pivoted upwardly and rearwardly about its rear hinges 11c to provide convenient access to the power and transmission system mounted beneath body 11.

Extending upwardly through top leg 19b of Z-shaped plate 19a is steering column 20. Steering column 20 is equipped at its unsecured end with a laterally extending handle bar 20a which permits unobstructed raising of body 11.

Turning now to Fig. 2 which shows a top plan view of my vehicle 10, but with body 11 and plate 19a removed, the numeral 21 generally designates a metal frame which primarily includes a pair of parallel longitudinal members 22 held in spaced relation by a number of cross members 23 constructed of 1¼ inch square tubing. One of the intermediate cross members 23a and the rear cross member 23b are extended outwardly of members 22 and connected together at their ends by supplemental longitudinal members 22a, thereby forming convenient mounting areas for storage batteries 24, four of which are used to power my vehicle. The peripheral members 22a and 23b are constructed of 1 inch x 1 inch x 1/8 inch angles which permit ready and rigid mounting of body 11. As pointed out above, body 11 is hinged to rear cross member 23b.

Members 22 also provide mounting surfaces for bearings 25 which carry the rear axle 26. Key-seated, welded or otherwise non-rotatingly secured to rear axle 26 and between members 22, are rear wheels 27 and driven sprocket 28.

Mounted on cross bars 23 and 23a is direct current electric motor 29 which is powered by four six-volt storage batteries 24 through a reversing switch (not shown) and toggle switch 30. Wiring between batteries 24 and motor 29 is carried by a terminal plate on the underside of plate 19a while the reversing switch may be conveniently mounted on the front or top side thereof. On its extended shaft motor 29 carries centrifugal clutch designated generally 31 which can be seen more clearly by reference to Fig. 3. Housing 31a of clutch 31 is rotatably mounted on the shaft of motor 29, while the clutch elements or shoes 31b are fixed to the motor shaft. Mounted on housing 31a of clutch 31 on the motor side thereof is sheave 32. Mounted on a pair of intermediate cross members 23 are a pair of bearings 33 which carry shaft 34. On one extension of shaft 34 is carried sheave 35 which is rotatively associated with sheave 32, and therefore clutch 31, by belts 36.

Sheave 32 has a pitch diameter of about 3½ inches while sheave 35 has an 8 inch diameter, yielding a speed reduction of about 2.3. Carried on the opposite extension of shaft 34, also outboard of bearing 33, is driving sprocket 37. Driving sprocket 37 provides rotational motion to driven sprocket 28 by means of roller chain 38. Driving sprocket 37 has a diameter of about 2½ inches while driven sprocket 28 has a pitch diameter of about 13 inches, resulting in a speed reduction of 5.2 or an overall speed reduction of about 12. Thus, with a one and one-quarter horsepower motor speed of about 2100 R. P. M., maximum wheel speed is 175 R. P. M. I provide either 600 x 6 or 550 x 8 tires which have a diameter of 18 inches or a circumference of about 4.7 feet. This yields a maximum speed of about 10 M. P. H. Slightly higher speeds can be achieved by using a higher R. P. M. motor.

With speeds of this order, I have found that I can eliminate a differential gear from the rear axle 26 but still effectively prevent undue ripping up of sod by spacing rear wheels 27 fairly close together, at a spacing of about 12 inches, center to center of tires on rear wheels 27. On the other hand, it is necessary that rear wheels 27 be spaced apart from each other the distance indicated to provide stability for vehicle 10 necessary during turning or for travelling the rolling terrain encountered on golf courses, especially during the unbalance occasioned when one front wheel is lower than the other.

Referring now especially to Fig. 3, which shows schematically the starting and brake system employed on my vehicle 10, the numeral 39 indicates a foot pedal which is fulcrumed on forward cross member 23c of frame 21, as at 40 by means of depending lug 41. Urging foot pedal 39 in a clockwise manner is compression spring 42, secured at one end to the underside of pedal 39 rearward of lug 41 and at the other end to cross member 23c. Depending from the underside of pedal 39 forward of lug 41 is rod 43 which is part of the linkage generally designated 44 serving to convey pedal motion to toggle switch 30 and clutch 31.

Linkage 44 includes connecting rod 45, which at one end is pivotally connected to the unsecured end of pedal rod 43, and which, at its other end, is pivotally connected to brake rod 46. Linkage adjustment 45b is provided in connecting rod 45. Brake rod 46 is pivotally mounted on frame 21 on cross member 23a at 46a. Pivotally mounted on brake rod 46 is brake shoe 47 and starter rod 48.

Operation

To start my vehicle, it is merely necessary to depress the toe portion of foot pedal 39 a matter of about one inch. The counterclockwise motion of pedal 39 (as viewed from the left of vehicle 10) causes pedal rod 43 to be translated downwardly and rearwardly. Through linkage 44, especially connecting rod 45, the motion is rearwardly applied to brake rod 46 causing it to be rotated clockwise about pivot point 46a. The consequent rearward motion of the unsecured end of brake rod 46 causes brake shoe 47 to be removed from the curved surface of clutch housing 31a. The same movement of brake rod 46 pulls starter rod 48 backwardly, moving toggle switch 30 to the "on" position and connecting the storage batteries 24 (four series-connected 6 volt, 160 amperes rating) to electric motor 29.

As motor 29 begins to turn, the centrifugal elements 31b are thrown radially outward and engage the cylindrical housing 31a of clutch 31b, setting the transmission system, comprising sheaves 32 and 35 and sprockets 37 and 28 in operation, resulting in turning rear wheels 27. Depending on the position of the reversing switch, wheels 27 propel vehicle 10 rearward or forward. Centrifugal clutch elements are set to engage the inner wall of clutch housing 31a at a speed of about 800 R. P. M., thus assuring a smooth and easy start-up without resorting to a resistor-type starter.

Upon removing foot pressure from foot pedal 29, compression spring 42 urges the pedal clockwise, reversing the movements of the various parts of the linkage 44 and applying brake shoe 47 to clutch 31 while at the same time shifting toggle switch 30 to the "off" position.

More rapid deceleration can be achieved by depressing the heel portion 39a of foot pedal 39, thereby reinforcing the pressure applied through linkage 44 and brake shoe 47 to clutch 31. To facilitate the normally applied accelerating pressure on the toe portion of pedal 39, I have curved that portion upwardly as at 39b.

The easy maneuverability and wide range of my vehicle achieved by its light weight and novel starting, braking and transmission system is not achieved by sacrifice of size. My vehicle measures over three feet in width and about six feet in length. Thus it has found its way on private golf courses where many other electric vehicles are banned.

Contributing to the easy handling of vehicle 10 is a light weight steering system 49, as seen in Fig. 2, operated by steering column 20, shown in Fig. 1. Vertical stub shaft 50, to which steering column 20 is connected as an extension, is rotatably mounted on cross bar 23d. Fixed to stub shaft 50 and extending rearwardly is arm 51. Pivotally secured to the unsecured end of arm 51 are tie rods 52 which are in turn pivotally secured at their other ends to wheel arms 52. Wheel arms 52 engage L-shaped spindles 53, which in turn are centrally secured to front wheels 12.

The foregoing detailed description has been given for clearness of understanding and no unnecessary limitations are to be inferred therefrom.

I claim:

A motorized vehicle for transporting golfers and their golf bags around a golf course comprising a rectangular frame, front and rear wheel means rotatively associated with said frame at opposite ends thereof, prime mover means mounted on said frame and driving said rear wheel means, body means mounted on said frame, seat means mounted on said body means, and a golf bag rack mounted on said body means rearwardly of said seat means, said golf bag rack comprising a pair of spaced knee members secured to said body means longitudinally thereof, and a pair of cross bar means secured transverse to said knee members, one of said cross bar means being positioned adjacent the knees of said knee members, and the other of said cross bar means being positioned adjacent the ends of said knee members adjacent said seat means whereby a golf bag may be handle-suspended from said knee positioned cross bar means acting as a fulcrum to urge said golf bag upwardly against said other cross bar means to achieve secure mounting of said golf bag without strapping.

References Cited in the file of this patent

UNITED STATES PATENTS

| | | |
|---|---|---|
| 1,098,939 | Chrysler | June 2, 1914 |
| 1,299,600 | Nicholl | Apr. 8, 1919 |
| 1,322,536 | Carr | Nov. 25, 1919 |
| 1,903,968 | Hosmer | Apr. 18, 1933 |
| 2,043,057 | Nevin | June 2, 1936 |
| 2,634,816 | Martin | Apr. 14, 1953 |
| 2,740,487 | Murty et al. | Apr. 3, 1956 |
| 2,749,997 | Deslippe | June 12, 1956 |

FOREIGN PATENTS

| | | |
|---|---|---|
| 122,412 | Great Britain | Apr. 12, 1920 |